(No Model.) 9 Sheets—Sheet 1.
J. M. SIMPSON.
MACHINE FOR CUTTING THE SCREW THREADS ON BOLTS.
No. 401,596. Patented Apr. 16, 1889.

Witnesses,
John B. Kaspari.
Jean Elliott.

Inventor.
Josiah M. Simpson
By Burton and Burton
his attys.

(No Model.) 9 Sheets—Sheet 2.

J. M. SIMPSON.
MACHINE FOR CUTTING THE SCREW THREADS ON BOLTS.

No. 401,596. Patented Apr. 16, 1889.

Witnesses.
John B. Kaspari
Jean Elliott

Inventor.
Josiah M. Simpson
By Burton and Burton
his attys (No Model.) 9 Sheets—Sheet 3.
J. M. SIMPSON.
MACHINE FOR CUTTING THE SCREW THREADS ON BOLTS.
No. 401,596. Patented Apr. 16, 1889.

(No Model.) 9 Sheets—Sheet 4.

J. M. SIMPSON.
MACHINE FOR CUTTING THE SCREW THREADS ON BOLTS.

No. 401,596. Patented Apr. 16, 1889.

Witnesses,
John R. Mettenstrom
Jean Elliott

Inventor,
Josiah M. Simpson
By his Attorneys Burton and Burton (No Model.) 9 Sheets—Sheet 5.
J. M. SIMPSON.
MACHINE FOR CUTTING THE SCREW THREADS ON BOLTS.
No. 401,596. Patented Apr. 16, 1889.
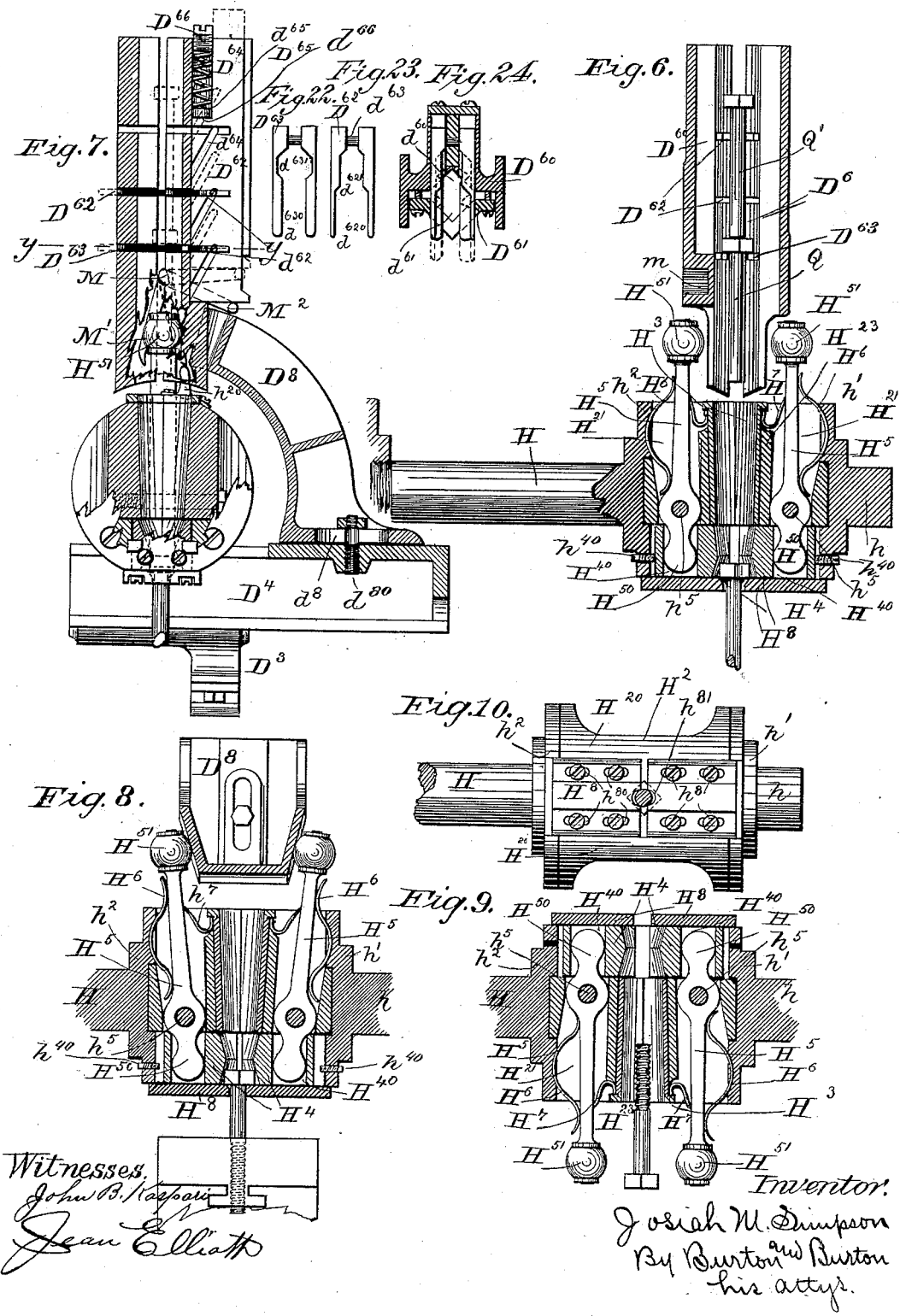
Witnesses
John B. Kaspari
Jean Elliott
Inventor
Josiah M. Simpson
By Burton and Burton
his attys.

(No Model.) 9 Sheets—Sheet 6.
J. M. SIMPSON.
MACHINE FOR CUTTING THE SCREW THREADS ON BOLTS.
No. 401,596. Patented Apr. 16, 1889.
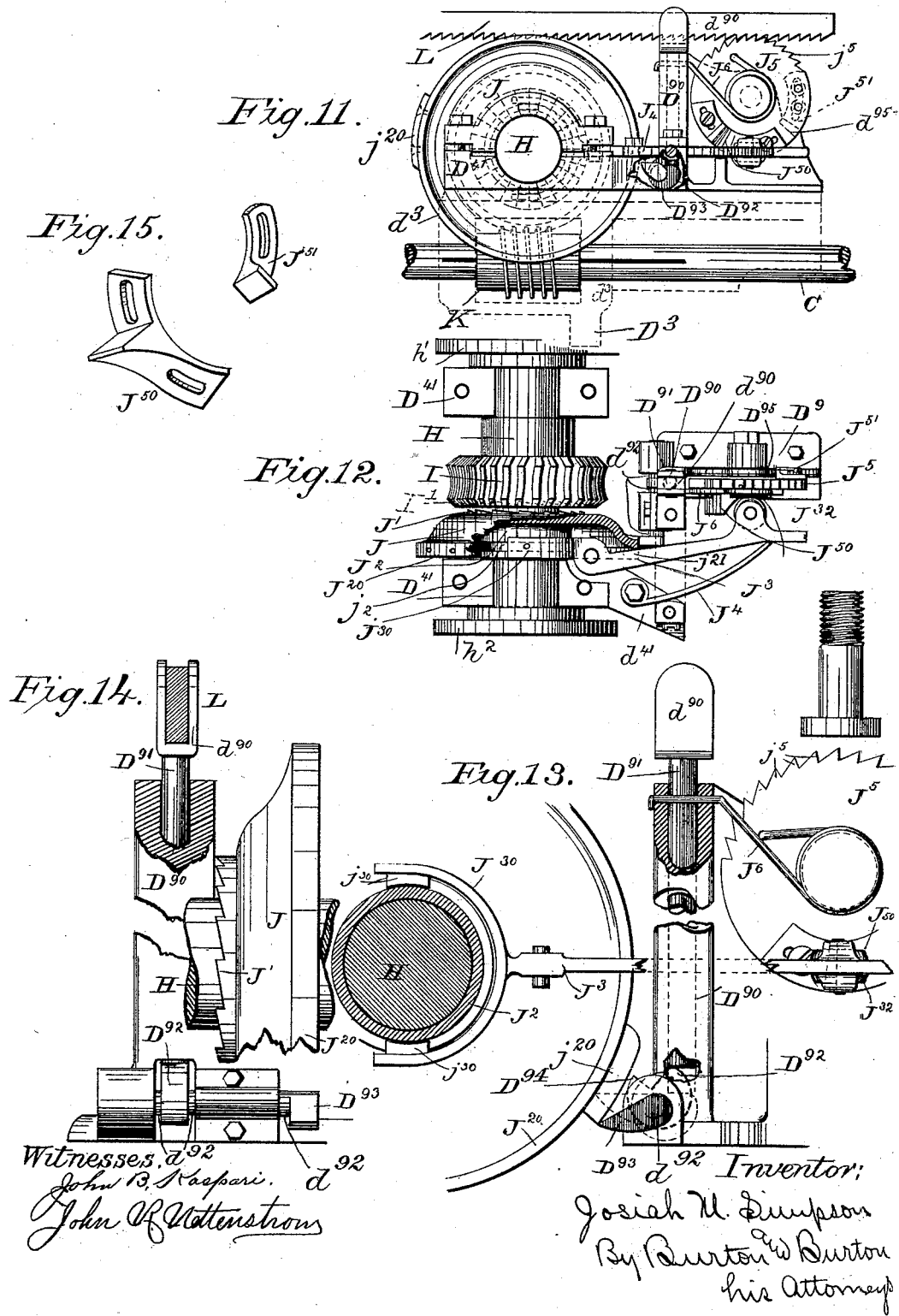

(No Model.) 9 Sheets—Sheet 7.
J. M. SIMPSON.
MACHINE FOR CUTTING THE SCREW THREADS ON BOLTS.
No. 401,596. Patented Apr. 16, 1889.
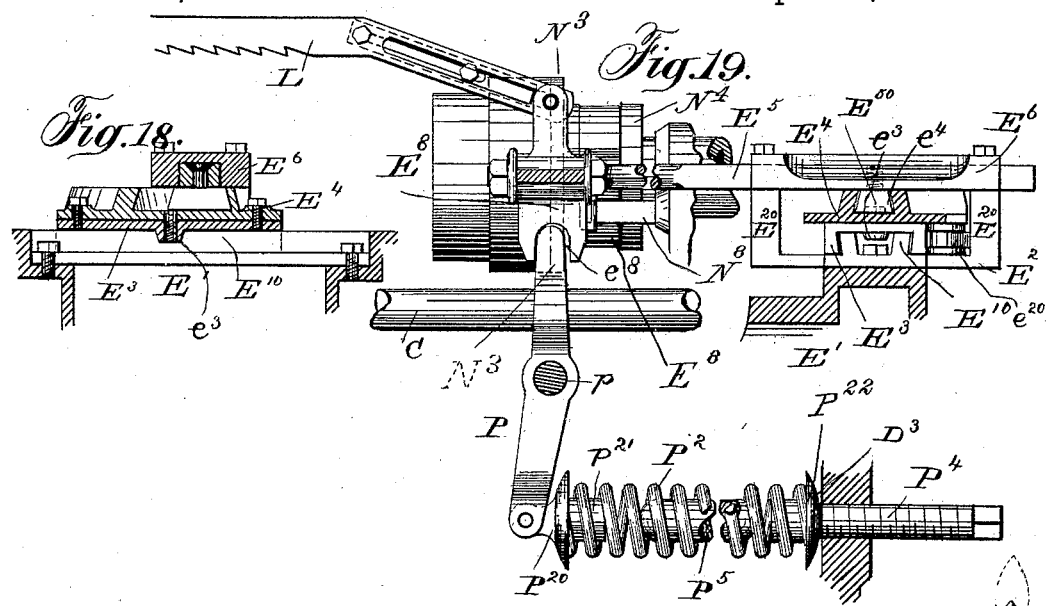
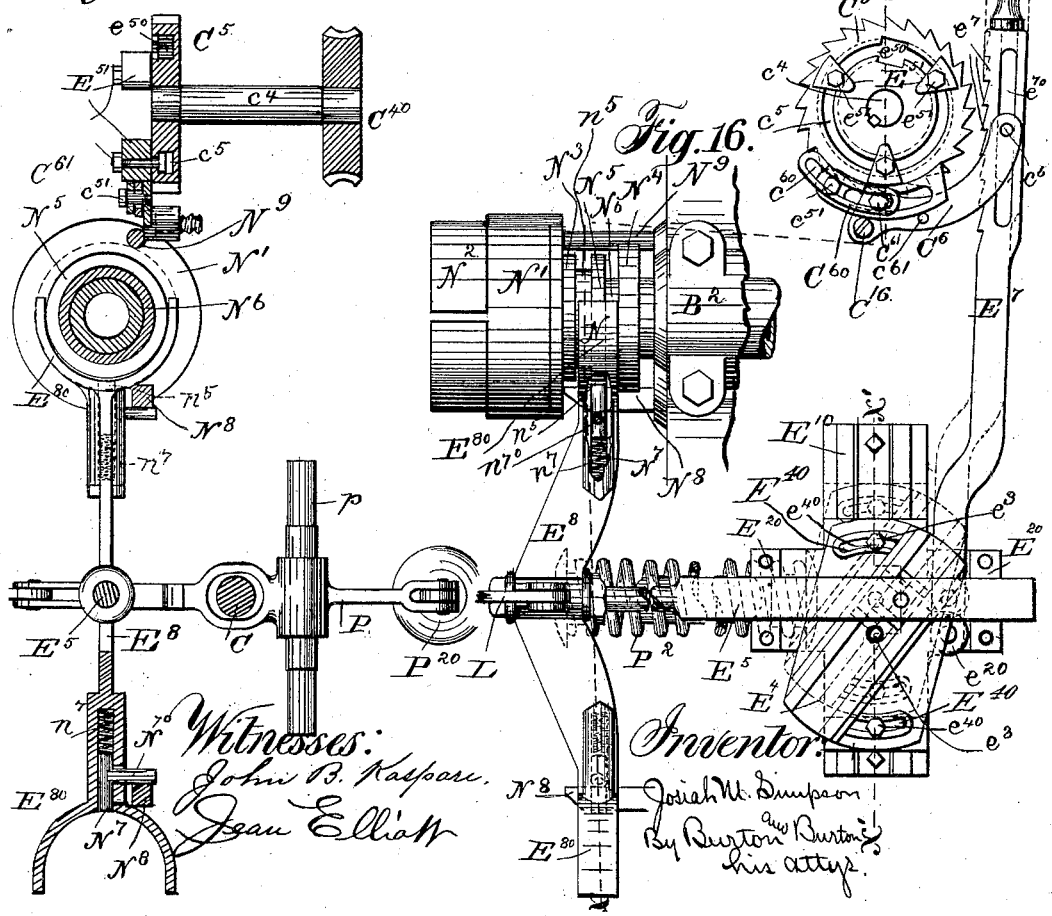

(No Model.) 9 Sheets—Sheet 8.

J. M. SIMPSON.
MACHINE FOR CUTTING THE SCREW THREADS ON BOLTS.

No. 401,596. Patented Apr. 16, 1889.

Witnesses:
Arthur Johnson
John R. Mettenstrom

Inventor:
Josiah M. Simpson
By Burton & Burton
his attys (No Model.)  9 Sheets—Sheet 9.
J. M. SIMPSON.
MACHINE FOR CUTTING THE SCREW THREADS ON BOLTS.
No. 401,596. Patented Apr. 16, 1889.

Witnesses.
Arthur Johnson.
Jean Elliott.
John R. Nettenstrom

Inventor
Josiah M. Simpson
By Burton and Burton
his attys.

UNITED STATES PATENT OFFICE.

JOSIAH M. SIMPSON, OF CHICAGO, ILLINOIS, ASSIGNOR TO WILLIAM DEERING & COMPANY, OF SAME PLACE.

MACHINE FOR CUTTING THE SCREW-THREADS ON BOLTS.

SPECIFICATION forming part of Letters Patent No. 401,596, dated April 16, 1889.

Application filed April 26, 1888. Serial No. 271,992. (No model.)

*To all whom it may concern:*

Be it known that I, JOSIAH M. SIMPSON, residing at Chicago, county of Cook, and State of Illinois, have invented certain new and useful Improvements in Bolt-Cutting Machines, which are fully set forth in the accompanying specification, reference being had to the drawings forming a part thereof.

Figure 1:
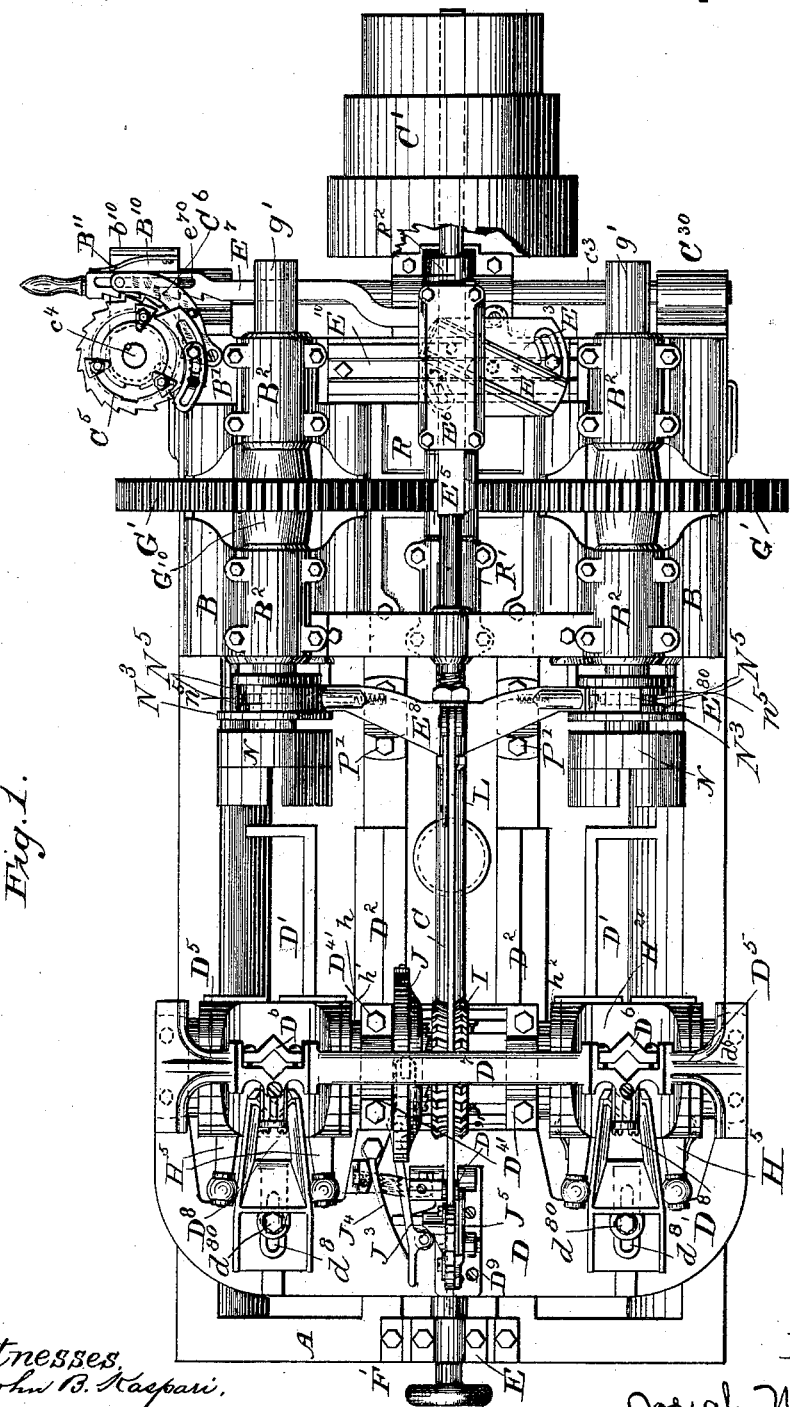
Figure 2:
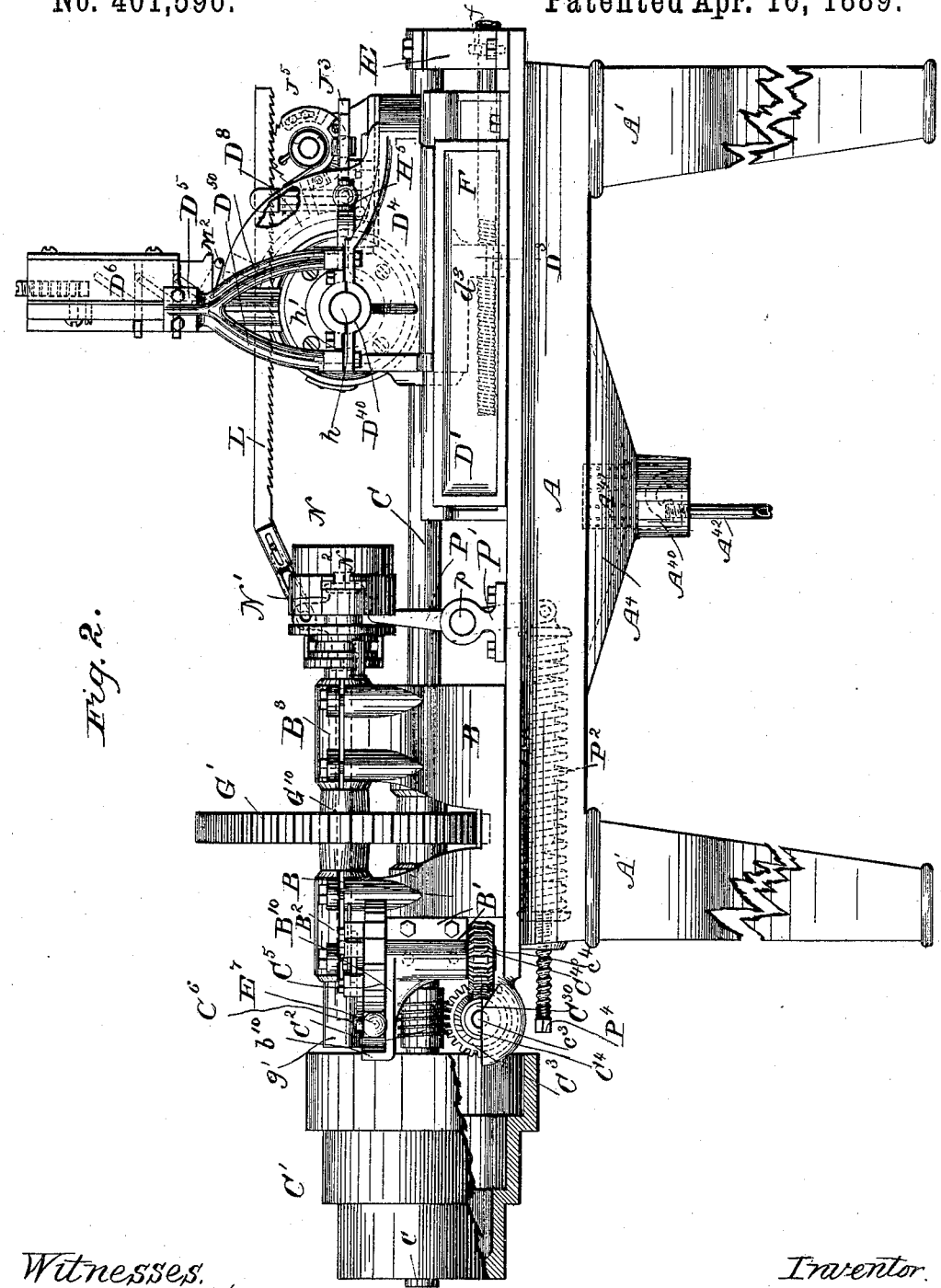
Figure 3:
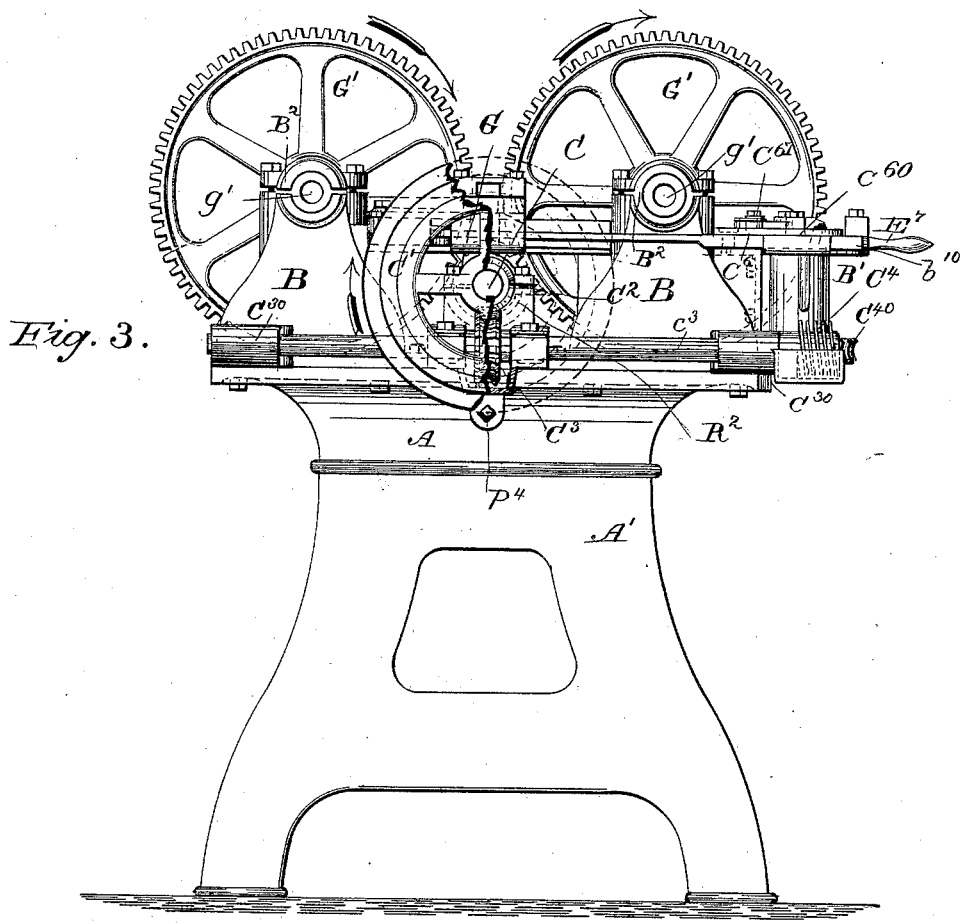
Figure 4:
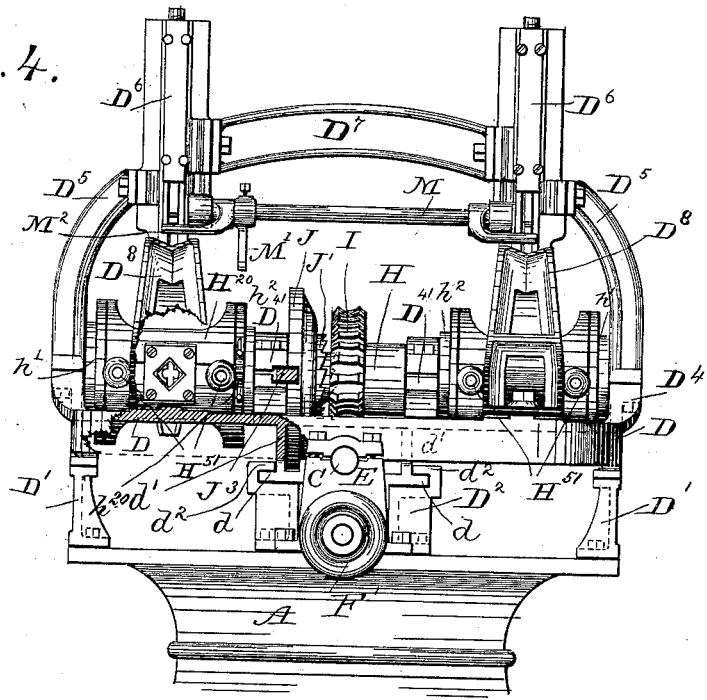
Figure 5:
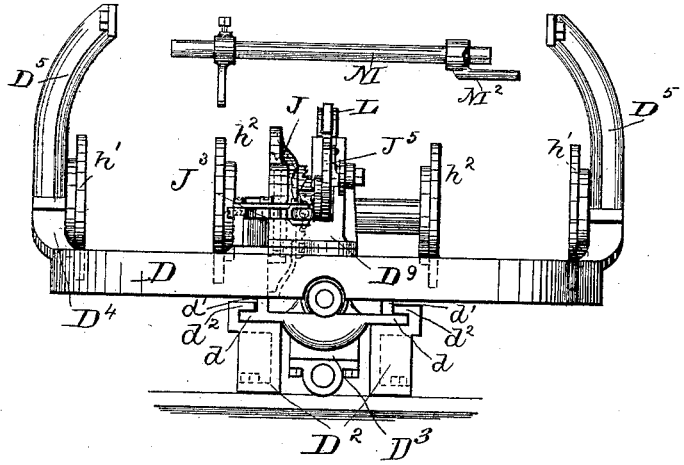
Figure 20:
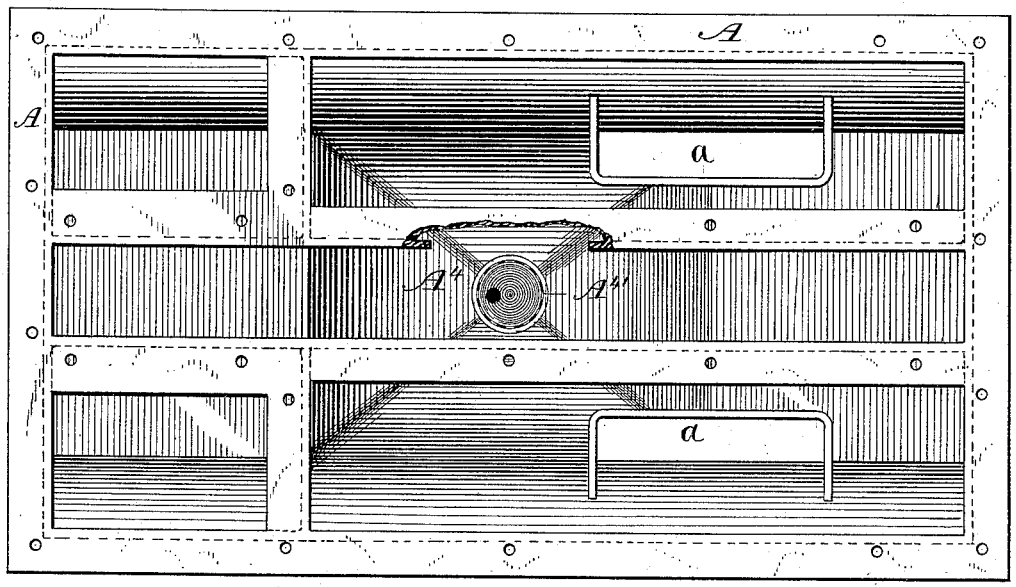
Figure 21:
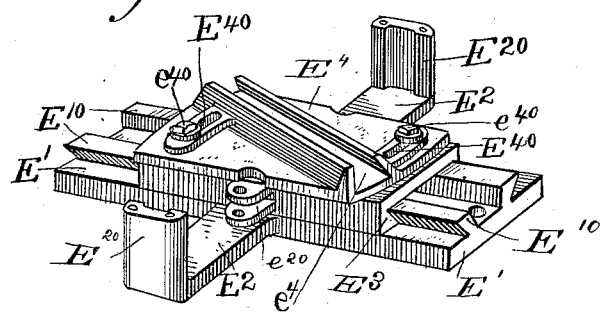
Figure 26:
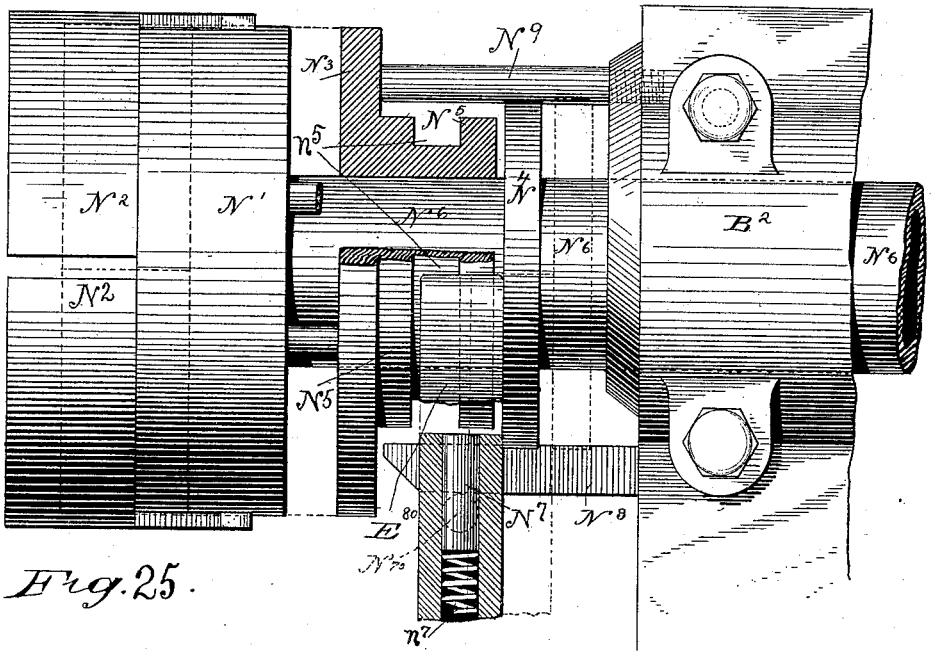
Figure 25:
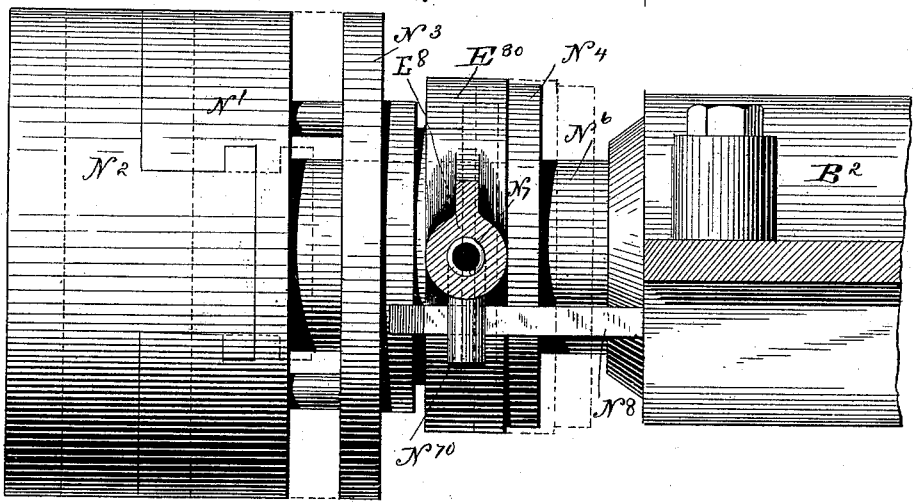

In the drawings, Figure 1 is a plan of my bolt-cutting machine. Fig. 2 is a side elevation of the same. Fig. 3 is a rear end elevation of the same, omitting the mechanism on the forward end of the frame. Fig. 4 is a forward end elevation, with the standard and some parts of the frame broken away to show the mechanism. Fig. 5 is a detail elevation of the parts of the mechanism which operate the bolt-carrying heads, said heads being removed. Fig. 6 is a transverse vertical section through the bolt-feeding channel and one of the bolt-carrying heads in its receiving position. Fig. 7 is a longitudinal vertical section through the same parts in the same position. Fig. 8 is a horizontal section through one of the bolt-carrying heads in the position in which it holds the bolt while the thread is being cut, showing also part of the cam for clamping the bolt in the head and part of the cutter-head. Fig. 9 is a vertical section through the bolt-carrying head in the position for dropping the bolt. Fig. 10 is a plan of the same. Fig. 11 is a detail side elevation of part of the mechanism for operating the clutch which engages the bolt-carrying heads with their driving-shaft. Fig. 12 is a plan of the same. Fig. 13 is an enlarged sectional detail elevation of part of the same, the section being made by a vertical plane transversely through the shaft which operates the bolt-carrying heads adjacent to the clutch-operating fork. Fig. 14 is a detail elevation of the same parts which are shown in Fig. 13, the direction of view being at right angles to that of said Fig. 13. Fig. 15 shows perspectives of a cam and a stop which pertain to the clutch-operating mechanism. Fig. 16 is a detail plan of the mechanism for advancing the cutter-head and regulating the rate and extent of such advance. Fig. 17 is a section through $x\,x$ in Fig. 16. Fig. 18 is a section through $x'\,x'$ on Fig. 16. Fig. 19 is a side elevation, partly sectional, of the parts shown in Fig. 16, so far as they can be seen from one side. Fig. 20 is a plan of the frame of my machine stripped of all mechanism. Fig. 21 is a perspective of a certain bracket, E' E², which supports part of the regulating mechanism. Figs. 22 and 23 are plans of slides pertaining to the bolt-feeding mechanism. Fig. 24 is a horizontal section through the bolt-feeding tube at the line $y\,y$ on Fig. 7. Fig. 25 is a detail elevation, and Fig. 26 is a detail plan of the bolt-cutter head and adjacent co-operating parts.

A is the base or bed frame, which is supported upon end standards, A' A'. Upon this bed there are supported at the rear end the fixed heads B B, which afford bearings for the bolt-cutting mechanism. At the forward end of the bed A there is supported upon it the sliding carriage D, which supports the mechanism by which the bolts are received and held during the cutting of the thread and afterward delivered.

C is the main driving-shaft of the machine. It extends longitudinally the entire length thereof, protruding beyond the bed A at the rear end, where it is provided with the driving-pulley C'. It obtains bearings at the forward end in the bracket E, secured to the bed A, and at the rear end in suitable journal-boxes, R' and R², on the frame R, which is supported upon the bed A between the heads B B. Upon this shaft C, just forward of the pulley C', there is fixed the worm C², which meshes with and drives the worm-wheel C³, which is secured upon the shaft $c^3$, which is journaled in the brackets C³⁰ C³⁰, one at each rear corner of the bed A. Upon said shaft $c^3$ there is fixed the worm C⁴, located near the right-hand end of the shaft, outside of its bearing in the bracket C³⁰. This worm meshes with and drives the worm-wheel C⁴⁰, which is fixed upon a vertical shaft, $c^4$, which is journaled in the bracket B', secured to the right-hand head B. At the upper end of said shaft $c^4$ there is fixed a ratchet-wheel, C⁵, whose use will be hereinafter explained.

Upon suitable seats formed upon the heads B there is secured the plate or horizontal bar E' E², which is in the form of a cross, having one of its bars transverse and the other longitudinal with respect to the machine. The transverse bar is bolted at its ends to the heads B B, which thus afford it support. The transverse bar E' has formed lengthwise upon its upper surface a dovetail rib, $E^{10}$, which is longitudinally channeled to allow space for the head of the bolts necessary in securing the several parts together. To this dovetail rib there is fitted the slide $E^3$, having a dovetail groove embracing the dovetail rib $E^{10}$, and upon the upper surface of the slide $E^3$ there is secured the plate $E^4$. The two plates $E^3$ $E^4$ are fastened together at the center of the latter by the bolt $e^3$. The plate $E^4$ has upon its upper face the dovetail groove $E^4$. Said plate has also two curved slots, $e^{40}$ $e^{40}$, one at each end, concentric about the bolt $e^3$. The plate may be cut away, so that these slots will be contained in the projecting arms, as illustrated in Fig. 16.

$E^5$ is a slide-bar, which at its rear end is guided in the plate $E^6$, which is secured upon the upwardly-extending ends $E^{20}$ $E^{20}$ of the longitudinal arm $E^2$ of the plate E' $E^2$, said plate $E^6$ having on its under side a slide-bearing for said bar $E^5$. To the under side of the bar $E^5$ there is secured the dovetail trammel-block $E^{50}$, which fits in the dovetail groove $e^4$ in the upper surface of the plate $E^4$. The arm $E^2$ of the plate E' $E^2$ is provided with a lug, $e^{20}$, to which is pivoted the ratchet-bar $E^7$. This bar extends transversely across the machine from its said pivot to the right-hand side, where it is provided with the ratchet-teeth $e^7$, which are adapted to be engaged by the ratchet-wheel $C^5$ in order to keep it in proper engagement with said wheel and to support it.

The bracket B' is provided with a horizontal extension, $B^{10}$, at its upper end, which extension reaches beyond the ratchet-wheels $C^5$ and affords support for said bar $E^7$. This horizontal extension $B^{10}$ has an upright flange, $b^{10}$, outside of the bar $E^7$, and to this flange there is secured the spring $B^{11}$, one end of which bears against the bar $E^7$ and tends to force it into engagement with the ratchet-wheel $C^5$. At the vicinity of said ratchet-wheel and of the teeth $e^7$ the bar $E^7$ has the slot $e^{70}$, and to the bracket B', at $C^{16}$, on its upper horizontal face, there is pivoted the lever $C^6$, which has the pin $c^6$ engaging in the slot $e^{70}$. To said lever $C^6$, upon its upper side, there is secured a cam, $C^{60}$, which is slotted in the arc of a circle and is secured to the lever $C^6$ by a bolt, $C^{61}$, through said slot $c^{60}$. A pin, $c^{61}$, on the lever $C^6$ operates to stop the cam $C^{60}$ at a certain position, for a purpose hereinafter explained.

The ratchet-wheel $C^5$ has in its upper face an undercut groove, $c^5$—that is, a groove which enlarges below the surface—and into this groove, through the openings $e^{50}$, which are the full size of the enlarged part of the groove, are inserted the bolts $e^{51}$ $e^{51}$, upon whose upper ends are secured the trip-blocks $E^{51}$ $E^{51}$, the heads of the bolt $e^{51}$ serving to detain them in the groove at all points except the opening $e^{50}$, and clamp-nut $e^{52}$ upon the upper ends of the bolts serving to fasten the trip-blocks at any desired position in the circumference of the groove. Any number of these trip-blocks may be employed, the number being varied for a purpose hereinafter explained.

Upon the shaft C there is secured the pinion G, which meshes with and drives the two gear-wheels, G' G', whose shafts g' g' are journaled one in each of the heads B B. The gear-wheels g' are feathered onto their shafts and are themselves stopped from longitudinal movement with respect to the bed by their hubs $G^{10}$, which fit closely between the journal-boxes $B^3$ $B^2$. Upon the forward ends of the shaft g' g' are secured the revolving cutters N N, which will be explained in detail hereinafter. The purposes of the ratchet-wheel $C^5$ and its associated mechanism and of the dovetail plates E' $E^2$ $E^3$ $E^4$ and the slide-bar $E^5$ and their associated parts are to afford means for regulating the pitch of the thread to be cut and also the length of the threaded portion of the bolt. The operation of this mechanism is as follows: The revolution of the shaft C by means of the worm $C^2$ communicates slow rotary motion to the shaft $c^3$, and by means of the worm $C^{31}$ thereon gives still slower rotary motion to the vertical shaft $c^4$ and thus to the ratchet-wheel $C^5$. The ratchet-bar $E^7$ being in engagement with the ratchet-wheel $C^5$, the rotation of the latter actuates the bar $E^7$ transversely with respect to the machine and causes it to slide the plates $E^3$ $E^4$ transversely on the dovetail bearing $E^{10}$. This movement of the plate $E^4$ gives to the bar $E^5$ a sliding movement at right angles to that of said plate by means of the block $E^{50}$, which is engaged in the dovetail groove $e^4$ of said plate $E^4$. The extent of the sliding movement thus communicated to the bar $E^5$ depends upon the angle between the groove $e^4$ and the dovetail bearing $E^{10}$. This angle, it will be observed, may be varied by loosening the bolts which pass through the slots $E^{40}$ and turning the plate $E^4$ about its pivot-bolt $e^3$ until the desired angle is obtained, and then setting again the bolts $e^{40}$. The bar $E^5$ at its forward end end is secured to the cross-yoke $E^8$, which at each end is provided with the half-circle fork $E^{80}$, which forks engage, respectively, with the cutter-heads, so that the movement of the bar $E^5$ moves said cutter-heads, sliding their shafts g' through the bearings $B^2$ and through the hubs of their driving gear-wheels G'. The amount of this longitudinal movement of the shafts of the cutter-heads obtained for each revolution of the cutter-heads determines the pitch of the thread cut by them. In order to determine the length of the threaded portion of the bolt, it is necessary to regulate the total amount of longitudinal movement as well as the rate of that movement. This is accomplished by means of the cam $C^{60}$ and the trip-blocks $E^{51}$. The stop-pin $c^{61}$ is so located that when the bar $E^7$ is in engagement with the ratchet-wheel said stop-pin holds the cam $C^{60}$ so that its concave face is eccentric to the wheel $C^5$, and at its end nearest the bar $C^7$ is in position to be engaged by one of the trip-blocks $E^{51}$ as they are revolved with the wheel $C^5$, and said blocks $E^{51}$ are at such distance from the center of the wheel $C^5$ that they will collide with the cam $C^{60}$ at about a line through the pivot of the lever $C^6$ and the center of the ratchet-wheel, and having thus engaged the cam will, upon a very slight further motion, force it outward—that is, away from the center of the wheel $C^5$, and thereby cause the lever $C^6$, turning on its pivot and having the pin $c^6$ engaging with the bar $E^7$, to force said bar outward and out of engagement with the wheel $C^5$. When this is accomplished, the concave face of the cam $C^{60}$ stands, as in Fig. 16, concentric with the wheel $C^5$, and the further travel of the trip-block $E^{51}$, as the wheel $C^5$ rotates, only serves to hold all the parts in that position until the trip-block runs off the cam $C^{60}$. When this occurs, the spring $B^{11}$, operating against the bar $E^7$, will force it back into engagement with the ratchet-wheel $C^5$, and in so doing will again throw the cam $C^{60}$ into position, where it will be engaged by the next trip-block $E^{51}$, which is rotated past it. Since the slide-bar $E^5$ is actuated longitudinally only so long as the bar $E^7$ is engaged by the ratchet-wheel $C^5$, the length of the thread cut on the bolt depends upon the length of time after one trip-block $E^{51}$ runs off the cam $C^{60}$, and before the next one engages it and forces it into the position shown in Fig. 16. This interval is determined by the distance between the several trip-blocks $E^{51}$ in the circumference of the groove in the wheel $C^5$, and the distance from the point at which the engagement of the said trip-blocks with the cam $C^{60}$ causes the disengagement of the bar $E^7$ from the ratchet-wheel to the end of the cam at which the trip-block runs off from it. The longest thread therefore will be cut when only one trip-block is used, and the cam $C^{60}$ is adjusted so that the minimum portion of it is exposed to the action of the trip-block by sliding it back on the bolt $C^{61}$ as far as possible without allowing it to slip off the stop-pin $c^{61}$. By varying the number of the trip-blocks and adjusting the cam $C^{60}$ any desired length of thread can be formed on the bolt.

For the purpose of lengthening the cam $C^{60}$, as may sometimes be desirable, I provide a supplemental slotted piece, $c^{60}$, which has the same curvature as the cam $C^{60}$, and is secured to it by the bolt $c^{51}$, which passes through the slot of the cam $c^{60}$, and is screwed into the end of the cam $C^{60}$ beyond the slot of the latter. The bolt $C^{61}$, which constitutes the pivot of the cam $C^{60}$ to the lever $C^6$, passes through the slots of both parts $c^{60}$ and $C^{60}$, and thereby co-operates with the bolt $c^{51}$ in keeping the concave edge of the part $c^{60}$ coincident with the concave edge of the principal cam $C^{60}$.

For the purpose of restoring the parts to their initial position after each thread is cut, so that they may be prepared to commence upon the next bolt, there is provided the lever P, which is pivoted by means of a rock-shaft, $p$, to which it is secured, in bearings in the brackets P′, secured upon the top of the bed A. The upper end of said lever engages in the notch $e^8$ in the lower side of the cross-yoke $E^8$, and the lower end is exposed to the pressure of the coil-spring $P^2$, which operates between said lever and a suitable stop which is fixed upon the end of an adjusting-screw, $P^4$, which is screwed through the end of the bed A. In detail this spring $P^2$ is connected and stopped as follows: A stop-head, $P^{20}$, is pivoted to the end of the lever P, and is provided on the rear side with a projection, $P^{21}$, which enters the coil-spring and retains it against the stop. A precisely similar stop, $P^{22}$, is provided at the other end of the spring and is secured to the end of the screw $P^4$. To keep the spring from buckling, a core, $P^5$, is placed within the coil of the spring, not entirely filling it longitudinally, only enough space being left to allow for the necessary compression and reaction of the spring. As soon as the bar $E^7$ is disengaged from the ratchet-wheel $C^5$, as above described, the spring $P^2$ operates to force back the bar $E^5$, and in so doing to drive, also, the bar $E^7$ transversely back to its original position, the dovetail slides operating to produce this movement in the reverse order from that which causes them to communicate the motion of the bar $E^7$ to the bar $E^5$, as above described.

The cutter-heads N, it may be said without going into detail as to their construction, as it does not constitute a part of this invention, are composed of the main body N′ and the tool-holding jaws $N^2$ and the plate $N^3$. The plate $N^3$ is rigid with the collar $N^5$, and both are adapted to slide longitudinally on the shaft, (or on the sleeve $N^6$, which connects the disk or flange $N^4$ with the body N′.) The construction is such that the withdrawal of the plate $N^3$ from the body N′ opens the jaws $N^2$ and withdraws the cutting-tool from the bolt on which it has been operating. Such withdrawal is possible to the amount of the space between the collar $N^5$ and the flange $N^4$, and when the spring $P^2$, reacting, forces back the cross-yoke $E^8$ that movement of the cross-yoke is caused to withdraw said plate $N^3$ from the body N′ and open the jaws, as described, by means of the plunger-pin $N^7$, which is inserted in the end of the cross-yoke, a coil-spring, $n^7$, being placed behind it to force it outward, and which, thus forced outward, enters the grooves $n^5$ in the collar $N^5$, and thus engaging said collar forces it back when the cross-head is forced back. This occurs at the very first part of the retreating movement of the cross-yoke $E^8$, and only during so much of it as is necessary to bring the collar $N^5$ against the flange $N^4$. At that same instant the half-circle fork $E^{80}$ comes in contact with the flange $N^4$, and the further movement of the cross-yoke $E^8$ draws the entire cutter-head back, sliding the shaft in its bearings, as above stated. In order, however, that the jaws $N^2$ may be properly closed together ready for the next cutting operation, it is necessary that the collar $N^5$ and the plate $N^3$ should be restored to their initial position, and in order to accomplish this, the plunger-pin $N^7$ is provided with a projection, $N^{70}$, which extends out through a suitable slot in the lower side of the cross-yoke $E^8$, and to the bearing $B^2$ of the shaft of the cutter-head there is secured the cam projection $N^8$, whose forward end is tapered, so that as the cross-yoke retreats the point of said cam enters between the projection $N^{70}$ on the pin $N^7$ and the half-circle fork $E^{80}$ forces the pin $N^7$ back into its socket, withdrawing it from the groove $n^5$. The end of the projection $N^8$ now collides with the plate $N^3$ and stops it, while the fork $E^{80}$, still engaging with the flange $N^4$, continues to draw it and with it the body $N'$ backward until the plate $N^3$ is again close against the rear sides of the body $N'$, and the jaws $N^2$ are closed together ready for the next cutting action. In order not to cramp the plate $N^3$ on the shaft in this operation, there is provided on the outer side of the shaft a stop-pin, $N^9$, of the same length as the cam projection $N^8$, and these two, engaging opposite sides of the plate $N^3$, together stop it in the manner described while the body $N'$ is drawn against it.

The carriage D at the forward end of the machine extends the entire width of the bed A, and is supported by the elevated tracks $D'$ $D'$, secured upon the side edges of the bed. It is further supported by the guide-tracks $D^2 D^2$, which are secured upon the bed between the two sides and are formed with the overlapping flanges $d^2 d^2$, which embrace the flanges $d\ d$, formed upon the downwardly-projecting ribs $d'$ of the carriage D. From said carriage there is formed, projecting downward between the two tracks $D^2 D^2$, the lug $D^3$, through which the screw-shaft F is screwed. Said shaft has a bearing in the bracket E at the forward end of the bed, and is provided with the retreating collar $f$ to keep it from endwise movement in its bearing. At the forward end it is provided with the hand-wheel $F'$, by which it may be rotated, and being so rotated it feeds the carriage D backward or forward to adapt its position to the length of bolt which is being operated upon.

The carriage D is composed of the base $D^4$ and two side brackets, $D^5 D^5$. There are also rigid with it certain bearings for the shaft of the bolt-carrying heads, and to the upper end of the side brackets, $D^5$, there are secured, respectively, the bolt-feed tubes $D^6 D^6$, and said bolt-feed tubes are connected by the brace $D^7$, which is firmly bolted to them, respectively, at its ends, so that in effect said feed-tubes form, with the brackets $D^5$ and the cross-brace $D^7$, part of a continuous frame substantially integral with the base $D^4$, and are therefore in effect a part of the carriage, since by the braces $D^7$ the remaining parts of the carriage are stiffened and kept in place. To the base $D^4$ of the carriage there are secured the cams $D^8 D^8$, which extend in vertical curves from said base upward and rearward, terminating at their junction with the feed-tubes, to which they may be further secured, thereby additionally strengthening the frame-work of the carriage and insuring their own rigidity. In the braces $D^4$ are formed journal-bearings $D^{40}$ $D^{40}$, one at each side, and the side brackets, $D^5$, are forked, so that the two limbs $D^{50} D^{50}$ of each stride said journal-bearings. In said bearings there are journaled, respectively, the gudgeons $h\ h$ of the disks $h'$, said gudgeons being in effect, as will be hereinafter explained, ends of the shaft of the revolving bolt-carrying heads. To the base $D^4$ of the carriage there are also secured journal-bearings $D^{41} D^{41}$, each a little distance aside from the middle line of the carriage and in line with the bearings $D^{40}$. In said bearings $D^{41}$ there is journaled the shaft H, upon which, between the bearings, there is secured certain mechanism, hereinafter described. Said shaft terminates at each end in a disk, $h^2$, precisely similar to the disks $h'$ and facing the latter, respectively. Between these pairs of disks $h'$ $h^2$ are secured the revolving bolt-carrying heads. These heads are composed of two cheeks, $H^{20} H^{20}$, the outer form of which is a half-cylinder cut away between its bases on the curved side merely to save weight, because the material is not there required. These cheeks have cavities formed on their flat sides, so that when they are jointed together to make the complete heads they inclose spaces in which certain mechanism, hereinafter described, operates. Being thus placed together, they are secured at the ends to the disks $h'\ h^2$, so that when bolted to them they complete the connection between the gudgeons $h\ h$ and the shaft H, so that said parts operate substantially as a continuous shaft in carrying the said revolving heads. The purpose of the heads is to receive and hold the bolt while it is being threaded and afterward to release and discharge it. In order to accomplish this purpose, there is formed in each of the cheeks $H^{20}$, at the middle point of their length and on their flat sides—that is to say, at the middle of the cylinder—a half-round and slightly-tapering cavity, $H^{23}$, said cavities facing each other and together making a complete taper hole through the head, in which is inserted the thimble $H^3$, which serves as a lining for said cavity. Each of said cheeks is further cut away on its flat side, on one edge, leaving the rectangular space in which are placed the clamp-blocks $H^4 H^4$. These clamp-blocks have space to slide longitudinally with respect to the shaft H, which is transversely with respect to the thimble $H^3$. Each of the cheeks $H^{20}$ is further provided on its flat face with the cavities $H^{21}$ $H^{21}$, extending across the face to the cut-away portion in which the clamp-blocks are located, said cavities on the two cheeks matching each other, and constituting transverse apertures through the head. In these cavities are located the clamp-levers $H^5$ $H^5$, which are secured upon pivots $h^5$ to the cheeks or to one of them. Said clamp-levers have each a short arm, $H^{50}$ $H^{50}$, which enters an aperture, $H^{40}$, formed through each of the clamp-blocks $H^4$. The other arm of the levers $H^5$, which is the long arm of the same, extends through the entire length of the cavity $H^{21}$, and protrudes through the head some little distance on the side opposite that at which the clamp-blocks $H^4$ are located, and said protruding ends are provided with the anti-friction rolls $H^{51}$. In the cavities $H^{21}$ are located the springs $H^6$ and $H^7$, bearing one upon the outer and one upon the inner side of the long arm of the lever $H^5$, and tending to hold said lever normally approximately at right angles to the shaft H. The proximate faces of the clamp-blocks $H^4$ $H^4$ are provided with cavities tapering toward the middle and enlarging toward both ends. The clamp-blocks $H^4$ are kept in the space provided for them by cover-plates $H^8$ $H^8$, which are secured to the cheeks by binding-screws $h^8$, through elongated holes $h^{80}$, so that said plates can be adjusted longitudinally with respect to the shaft H. Each of said plates is provided with a notch, $h^{81}$, said notches together forming, where the plates are in contact at their proximate edges, a circular opening. The long arms of the levers $H^5$, projecting beyond the heads, stand one on either side of the vertical plane of the upper end of the cam $D^8$ in their uppermost position, and at such distance apart that said end may pass between them, or, rather, since the cam is fixed and said lever-arms revolve within the head, so that said arms may pass one on either side of the cam. As said heads revolve, therefore, the cam, widening downward from the top toward the bottom, causes the arms to be separated, and therefore forces the short arms $H^{50}$ toward each other. Said short arms in this movement carry with them the clamp-blocks $H^4$, into whose cavities $H^{40}$ they protrude. When the revolution of the head has caused the anti-friction rolls $H^{51}$ to pass off the cam $D^8$ at its lower end, the springs $H^6$ force said levers back to their normal position and thereby draw the clamp-blocks $H^4$ apart again. The purpose of this action will be apparent after a further description of the mechanism. Between the bearings $D^{41}$ $D^{41}$ there is located upon the shaft H the worm-wheel I, having upon one face the clutch-rim I'. On the same side of the worm-wheel I on which it is provided with said clutch-rim there is located, upon the shaft H, the clutch-wheel J, having a clutch-rim, J', corresponding to the clutch-rim I'.

The worm-wheel I is loose on the shaft H. The clutch-wheel J is feathered on the shaft, adapted to slide longitudinally into and out of engagement with the wheel I. In order to move it thus toward and from said wheel I, its hub is provided with a groove, $j^2$, and a shifting-lever, $J^3$, with the half-circle fork $J^{30}$, which spans the hub $J^2$, is provided at its two ends with projections $j^{30}$, which enter the groove $j^2$ at opposite sides of the shaft H. The lever $J^3$ is pivoted upon the arm $d^{41}$, secured to the bearing $D^{41}$, said lever having its long arm extending forward some distance and provided with an anti-friction roll, $J^{32}$. A spring, $J^4$, secured to the arms $d^{41}$, presses against the arm of the lever $J^3$, tending to hold it into position to keep the clutch-wheel out of engagement with the worm-wheel I. Upon the base $D^4$ of the carriage D, forward of the shaft H and of the bolt-carrying heads, there is secured the bracket $D^9$, upon whose upright portion there is journaled on the horizontal stud-bolt a ratchet-wheel, being in about the same vertical plane as the worm-wheel I. The bracket $D^9$ has an upwardly-extending arm, $D^{90}$, in the vertical plane of the ratchet-wheel $J^5$, and the vertical web $D^{95}$, uniting the base of said bracket to said arm, extending on the back side of the ratchet-wheel. To said arm $D^{90}$ is secured one end of the spring $J^6$, which is coiled once or twice around the shaft or bearing of the wheel $J^5$, and finally has the other end fastened into said wheel, the direction of the coil of the spring being such as to tend to resist the revolution of the wheel backward—that is, with its upper edge moving toward the rear—tending therefore by its reaction to revolve the wheel forward. Upon the face of the wheel $J^5$ which is toward the lever $J^3$ there is secured the cam $J^{50}$, and on the opposite side there is secured the stop $J^{51}$. Said cam is in position to come in contact with the anti-friction-roll $J^{32}$ on the long arm of the lever $J^3$, and the spring $J^4$ tends to force said lever-arm toward the wheel J and toward the cam. The web $D^{95}$ of the bracket $D^9$ is cut away to allow the stop $J^{51}$ space for movement as the wheel $J^5$ is partly rotated, and the shoulder $d^{95}$ on said web arrests the stop $J^{51}$ at one limit of its movement, and thereby limits the movement of the wheel $J^5$, as hereinafter explained. The clutch-wheel J has the cam rim or flange $J^2$, serving two purposes, as hereinafter explained.

The lateral edge of the cam-rim $j^{21}$ has a notch, $j^{20}$, into which the lever $J^3$ may pass when its roll $J^{32}$ is out of engagement with the cam $J^{50}$. When the said cam has engaged said roll and causes the lever to shift the clutch-wheel J into engagement with the worm-wheel I, the first effect of the motion thus communicated, as hereinafter described, is to carry the notch $j^{21}$ away from the lever $J^3$, and the lateral edge of the rim $J^{20}$ thereupon acts as the delay-surface for holding the lever in the position to which it has been forced by the cam $J^{50}$ and keeping the wheel $J^2$ in engagement with the worm-wheel I.

The worm-wheel I is actuated by the worm K, which is revolved by the shaft C, which extends underneath the carriage D. In the vicinity of the worm K, which is movable longitudinally with respect to the shaft, said carriage is provided on its under side with a housing, $d^3$, within which the worm is placed and wherein it fits quite closely, so that it is carried accurately with the carriage when the latter is longitudinally adjusted, and the feather on the shaft C extends over the entire range of such adjustment, so that at all positions to which the carriage may be moved the shaft will continue to drive the worm, and therefore the worm-wheel I. To the cross-yoke $E^8$ there is adjustably connected the ratchet-bar L, which extends from said connection longitudinally with respect to the shaft C and vertically above the same over the worm I to the ratchet-wheel $J^5$, with whose ratchet $j^5$ it engages. The upper end of the arm $D^{90}$ of the bracket $D^9$ is provided with a seat or bearing, $d^{90}$, through which the ratchet-bar L passes and in which it rests, the height of said seat being such as to permit the bar to drop down into full engagement with the ratchet $j^5$. Through the said arm $D^{90}$ there passes the plunger $D^{91}$, and at the lower end of said plunger there is located the cam $D^{92}$, which is secured upon the short shaft $d^{92}$, journaled in the bracket $D^9$. Upon one end of said shaft there is provided the short lever-arm $D^{93}$, which is in the vertical plane of the cam-rim $J^{20}$ of the clutch-wheel J. At one point on said cam-rim it is provided with the projection $j^{20}$, which, as the said clutch-wheel revolves, collides with the lever-arm $D^{93}$, and, revolving the shaft $d^{92}$, causes the cam $D^{92}$ to elevate the plunger $D^{91}$ and in so doing to lift the ratchet-bar L out of engagement with the ratchet $j^5$ of the wheel $J^5$. The time, order, and purpose of these several movements will be hereinafter explained more fully; but the first effect which may be noticed here is that the ratchet-wheel $J^5$, being released from the ratchet-bar L, will be immediately reversed by the spring $J^6$ until the stop $J^{51}$ collides with the shoulder $D^{95}$ on the bracket $D^9$, as described above. The cam $D^{92}$ is adapted for the action described and attributed to it—namely, lifting the plunger $D^{91}$ by means of the right-angle notch $D^{94}$, in which the lower end of the plunger stands when it is down, the horizontal side of said notch stopping the end of the plunger and forming a seat for it, while the vertical side of said notch is stopped against the side of the plunger and prevents the further rotation of the cam, thereby obviating the necessity for any other stop for the cam.

The bolt-feed tubes $D^6$ comprise each the forward section, $D^{60}$, which constitutes the main body, and the rear cap-plate, $D^{61}$. The body $D^{60}$ is formed with an angular channel, $d^{60}$, extending vertically along its entire rear face, and the rear plate, $D^{61}$, is formed with a similar and equal channel, $d^{61}$. These two channels together form the path of the bolts as they are fed or allowed to descend to the bolt-carrying heads. Their descent in said channels is controlled by means of the slides $D^{62}$ and $D^{63}$. Said slides are placed in horizontal slots $d^{62}$, formed at intervals through both the body $D^{60}$ and the front plate, $D^{61}$. Only two of these slots are employed at once; but a larger number are provided, in order that the slides $D^{62}$ and $D^{63}$ may be located in different positions, according to the length of the bolts which are being fed through the channels. The slides $D^{62}$ and $D^{63}$ are actuated back and forth in the slots $d^{62}$ by means of the vertical plate $D^{64}$, which is located in the vertical slide-bearing provided in front side of the body $D^{60}$, and retained therein by the front cover-plate, $D^{61}$. Said plate $D^{64}$ has notches or slots $d^{64}$ extending from its inner edge obliquely upward, and said notches are adapted to engage the cross-necks $d^{63}$ of the slides $D^{62}$ and $D^{63}$, so that as said slide-plate $D^{64}$ is actuated vertically it will actuate said slides $D^{62}$ $D^{63}$ horizontally. For the purpose of thus actuating the slide-plate $D^{64}$ there is provided the rock-shaft M, which is journaled in bearings $m$ near the lower end of the bolt-feed tubes $D^6$, said bearings being formed on the body $D^{60}$, and to said rock-shaft is secured the lever-arm M′ in the vertical plane of one of the disks $H^2$, and said disk is provided with a projecting lug, $h^{20}$, which engages the arm M′ once in each revolution of the shaft H, and in so doing rocks the shaft M a short distance. To said shaft there are also secured, adjacent to its bearings, respectively, the lever-arms $M^2$ $M^2$, which extend out from the shaft far enough to clear the bearings and the body $D^{60}$, and are then extended laterally, so that they project under the lower end of the slide-plate $D^{64}$ and lift it as the shaft M is rocked, as described. The slide-plates $D^{64}$ are cut away at their upper inner corner to form a shoulder, $d^{66}$, and in the upper end of the body $D^{60}$ of the bolt-feed tubes there is formed a socket in which is located the plunger $d^{65}$, which is actuated by the spring $D^{65}$, placed above it in said socket and restrained by the stop and adjusting-screw $D^{66}$. This spring causes the slide-plate $D^{64}$ to descend and force down the lever-arm $M^2$ as soon as the lever-arm M′ is free from the actuation of the projection $h^{20}$. The said slide-plate therefore receives one movement upward and one movement downward for each complete revolution of the heads, its upward movement forcing the slides $D^{62}$ and $D^{63}$ rearward, and its downward movement forcing them forward. The slide-plate $D^{62}$ is located in one of the slots $d^{62}$, located at least as far from the lower end of the bolt-feed tubes as the length of the bolt to be handled and the slide-plate $D^{63}$ is placed in a slot whose distance above the plate $D^{62}$ is somewhat less than the length of the bolt to be handled.

The upper plate, $D^{62}$, has an aperture or notch which may be called its "mouth," comprising two parts, $d^{620}$ and $d^{621}$, the former being at the end and larger than the latter. The slide $D^{63}$, on the contrary, has its mouth composed of two parts, $d^{630}$ and $d^{631}$, the former at the end and smaller than the latter. In each case the larger portion of the mouth is large enough to allow the head of the bolt to pass, and in each case the smaller portion of the mouth is too small for the head of the bolt to pass, but large enough for the stem. In the normal position of the slide-plate $D^{64}$ and in the consequent normal position of the slides $D^{62}$ $D^{63}$ it will be seen that the slide $D^{63}$ stands with the smaller portion, $d^{630}$, of its mouth in the channel or path of the bolts through the tube $D^6$, and therefore in position to arrest and detain the bolt represented by Q in Fig. 6, by the head of said bolt engaging with the slide while the stem passes through the portion $d^{630}$ of the mouth. The next following bolt (represented by Q′) will stand upon the head of the bolt Q, as illustrated in Fig. 6. In this position the larger portion, $d^{620}$, of the mouth of the slide $D^{62}$ is in the path of the bolt. When the projection $h^{20}$ on the disk $h^2$ engages the lever-arm M′ and rocks the shaft M, causing the arm $M^2$ to force upward the slide-plate $D^{64}$, and to force rearward the slides $D^{62}$ $D^{63}$, the said movement of the slide $D^{63}$ brings the portion $d^{631}$ of its mouth in the path of the bolt Q, and thereby allows said bolt to fall through said mouth. The same movement, however, brings the portion $d^{621}$ of the mouth of the slide $D^{62}$ in the path of the bolt Q′, so that while said bolt descends, following the bolt Q, its head is arrested by the slide $D^{62}$, since it cannot pass through the smaller part, $d^{621}$, of the mouth of said slide. When the projection $h^{20}$ runs off the lever-arm M′ and the rock-shaft M is thereby released, the spring $D^{65}$, forcing downward the slide-plate $D^{64}$, and said slide-plate thereby forcing forward again the slides $D^{62}$ $D^{63}$, the larger portion, $d^{620}$, of the mouth of the upper slide, $D^{62}$, being restored in the path of the bolt, allows the head of said bolt to pass through it, and the same movement having restored the smaller portion, $d^{630}$, of the mouth of the lower slide, $D^{63}$, that slide arrests and detains the falling bolt by its head in the same manner that the first bolt, Q, was held in the initial position. Further bolts, as $Q^2$, standing in series above the two whose movement has been described to illustrate the action, will follow down and successively take the positions of those two, as described.

The operation of this mechanism has been partly indicated in the course of its description; but it will now be followed in detail throughout.

Bolts being fed in any desired manner into the upper end of the feed-tubes $D^6$ fall through said tubes and assume the positions illustrated, the normal positions of the slides $D^{62}$ $D^{63}$ being as above described. The position of the other parts of the mechanism at starting may be assumed to be as follows: The bolt-carrying heads stand in the position illustrated in Fig. 8 with the bolt-receiving aperture, which is lined by the thimble $H^3$, standing horizontally with its wider end forward, a bolt being held in the clamps and projecting out rearward through the plates $H^8$. The cutter-heads N are at their rearmost position, the jaws being closed together. That position is as illustrated in Fig. 16. The bar $E^5$ is therefore at its rearmost position, and this involves the fact that the slide $E^3$ is at the position farthest removed from the side of the machine at which is located the ratchet-wheel $C^5$. The ratchet-bar $E^7$ is therefore also at the extreme of its movement in the same direction. It will be assumed that the trip-block $E^{51}$ has just run off the corner of the cam $C^{60}$, and that therefore the ratchet $e^7$ is engaged with the ratchet-wheel $C^5$. Power being applied to the machine through the pulley C′, the revolution of the shaft C, communicating rotary motion through the train described to the vertical shaft $c^4$ and to the ratchet-wheel $C^5$, causes said ratchet-wheel to draw the ratchet-bar $E^7$ toward the side of the machine at which said wheel is located, and in so doing, by means of the slide-plates E′ $E^2$ $E^3$ $E^4$, it causes the slide-bar $E^5$ to be moved longitudinally forward. Meanwhile the pinion G in the shaft C is communicating rotary motion through the gear-wheels G′ to the shaft g′ of the cutter-heads N.

The longitudinal movement of the slide-bar $E^5$ produces two effects: First, through the medium of the cross-yoke $E^8$ and its forks engaging the cutter-heads, as described, it advances said cutter-heads; second, by means of the ratchet-bar L sliding back over the ratchet-wheel $J^5$ it prepares said ratchet-bar to actuate said ratchet-wheel and the clutch mechanism which is controlled thereby as soon as its own movement shall be reversed. The cutter-heads, being thus advanced and revolving, engage the protruding end of the bolt and cut thereon a thread whose pitch is determined, as hereinabove described, by the relative positions and directions of the dovetail slides $E^3$ $E^4$, and whose length or extent upon the bolt is determined, as described, by the number and position of the trip-blocks $E^{51}$ and the position of the cam $C^{60}$. When the trip-block $E^{51}$ encounters the cam $C^{60}$ and follows it sufficiently to rock the lever $C^6$ on its pivot and to force the lever $E^7$ out of engagement with the ratchet-wheel $C^5$, as hereinabove described, the spring $P^2$, reacting against the stop $P^{22}$ and, through the medium of the stops $P^{20}$, the lever P, cross-yoke $E^8$, and pin $N^7$, engaging the collar $N^5$, draws said collar, and with it the disk $N^3$, backward from the body N′ of the cutter-head, and thereby opens the jaws $N^2$, withdrawing the cutting-tool from the bolt. The further action of the spring $P^2$, bringing the half-circle fork $E^{80}$ of the cross-yoke $E^8$ against the disk of the flange $N^4$, withdraws the entire cutter-head, sliding its shaft through its bearings toward the bearings $B^2$. A little before colliding with that bearing, however, the projection $N^{70}$ on the pin $N^7$ encounters the beveled end of the cam projection $N^8$, and is thereby withdrawn from the groove $n^5$ in the collar $N^5$, and immediately thereafter the disk $N^3$, colliding with the end of the cam projection $N^8$, and also with the projecting pin $N^9$, is stopped while the half-circle fork $E^{80}$, at the same instant coming in contact with the flange $N^4$, continues to draw the head $N'$ back the remaining short distance until said flange reaches the bearing $B^2$, and in that distance the jaws $N^2$ are again forced together. This retreating movement, caused by the spring $P^2$, is shared also by the ratchet-bar L, which in thus retreating engages and rotates the ratchet-wheel $J^5$, coiling the spring $J^6$ and preparing it therefore to reverse the movement of said ratchet-wheel when the latter is released afterward. This partial rotation of the wheel $J^5$ brings the cam $J^{50}$ against the anti-friction roll $J^{32}$ on the end of the shifting-lever $J^3$, and forces that end of the lever out from the wheel $J^5$, thereby throwing the wheel $J^2$ in the opposite direction into engagement with the worm-wheel I, which is receiving continuous motion from the worm K on the shaft C. This engagement of the clutch-wheel with the worm-wheel communicates rotary motion to the shaft H and to the bolt-carrying heads thereon. As above stated, the rotation of the wheel $J^2$ first causes its lateral edge to come into position to act as a delay-surface to hold the lever $J^3$ in the position to which it is forced by the cam $J^{50}$, as above stated, so that whatever amount of movement the wheel $J^5$ receives from the bar L it can in no case cause the release of the lever $J^3$ until one complete revolution of the shaft H and the wheel J has been made. The position of the cam projection $j^{20}$ on the rim $J^{20}$ of the weeel $J^2$ is such that sufficient time for the complete longitudinal retreat of the bar L is allowed before said cam collides with the lever-arm $d^{93}$. When said collision does occur and the cam $D^{92}$ lifts the plunger $D^{91}$ and releases the bar L from the ratchet-wheel $J^5$, the spring $J^6$, reacting, revolves the wheel until the stop $J^{51}$ collides with the shoulder $d^{95}$ on the bracket $D^9$, and detains said wheel in its initial position. Meanwhile and afterward the continuing revolution of the shaft H by the engagement of the clutch-wheel J and worm-wheel I is revolving the bolt-carrying heads. It will be remembered that their initial position before the engagement of the clutch-wheel, while the shaft H was at rest, was with the bolt projecting horizontally rearward toward the cutter-heads. The revolution of the shaft H carries the anti-friction rolls $H^{51}$ off the lower edge of the cam $D^8$, whereupon the springs $H^6$ force the long arms of the levers $H^5$ inward and the short arms outward, thereby separating the clamp-blocks $H^4$ and releasing the bolt from their grasp. A little further revolution of the heads brings the bolt-cavity, the thimble $H^3$, into vertical position, whereupon the bolt drops out, falling through the opening $a$ in the bed and into any receptacle which may be provided underneath the machine. Another half-revolution in the same direction brings the bolt-cavity, (thimble $H^3$,) with its wide end or receiving-mouth upward, underneath the discharge end of the bolt-feeding tube. Just before this position is reached the projection $h^{20}$ collides with the arm M, and then slips off said arm, operating the slides $D^{62}$ $D^{63}$ in the manner hereinabove described, and causing another bolt to be dropped down through said feed-tube into the bolt-cavity $H^3$. The plates $H^8$ are adjusted with regard to the size of the bolt being handled, so that the shank of the bolt will pass through the opening $h^{81}$ without any appreciable lateral play; and in order to guide the bolt so that it shall enter this restricted aperture as it falls through the thimble $H^4$, the clamp-blocks $H^4$ have the aperture formed between them tapering from the receiving end, the convergence of the sides being such that, if continued when the blocks are close together, said sides would about meet at the aperture $h^{81}$, when it is made smallest by the closing together of the plate $H^8$. This causes that if the bolt should not tend directly toward the aperture $h^{81}$, but should strike the sides of the taper channel through which it falls, its lower end would be directed by the slope of those sides into the aperture $h^{81}$. Further, to insure this result the aperture $h^{81}$ may be countersunk on the under side of the plate $H^8$, thus widening its receiving-mouth slightly. Small set-screws $h^{40}$ are provided in the disks $H^2$, which pass through the same and form stops for the clamp-blocks $H^4$, which limit the movement which can be communicated to said blocks by the reaction of the springs $H^6$, and said set-screws are adjusted so that the taper of the aperture between said blocks shall bear the relation described to the aperture $h^{81}$ which is left between the plates $H^2$ after they have been adjusted to the size of the bolt. This adjustment is calculated to be such, also, that the aperture between the blocks $H^4$ at its most restricted point is sufficient to allow head of the bolt to pass. By this means the bolt is guided through the plate $H^8$, and its head rests and is supported squarely upon the under face of that plate, and in such position are the several parts that when the clamp-blocks are brought together, even if the bolt should be otherwise than squarely supported, the pressure of the tapering sides of the clamp-blocks upon the corners of the bolt-head will cause it to assume a true position projecting from the head in the line of the axis of the thimble $H^3$. The further revolution of the head now brings the cam-rolls $H^{51}$ on the ends of the levers $H^5$, one on each side of the cam $D^8$, and during the next quarter-revolution said levers are forced apart by the widening cam, and the clamp-blocks $H^4$ are thereby forced together and caused to grip the bolt firmly, and in this situation the bolt arrives at the horizontal position, projecting toward the cutter-heads. At this instant the notch $j^{21}$ in the rim $J^2$ of the wheel J arrives at the lever $J^3$, and the spring $J^4$ forces said lever into said notch, thereby withdrawing the clutch-wheel from engagement with the worm-wheel I, and at the same time positively locking said clutch-wheel by the engagement of the wheel in said notch $j^{21}$. The bolt-carrying heads are thus brought to rest in position to hold the bolt ready for the cutting of the thread thereon, as first above described. It will be observed that the movement of the several parts which is caused by the reaction of the spring $P^2$ is practically almost instantaneous, and that therefore during the time occupied by almost the entire revolution of the bolt-carrying heads, as above described, the feeding mechanism at the other machine will be inactive, the bar $E^7$ being out of engagement with the ratchet-wheel $C^5$. It is necessary, therefore, at the least that the cam $C^{60}$ must be in engagement with one of the trip-blocks $E^{51}$ long enough to permit this complete revolution of the bolt-carrying heads.

The bed A is formed with the web $A^4$ between its strengthening-bars, which is continuous except where the openings $a$ are formed to allow the bolt to drop through, and said web is depressed at the middle, as shown in Figs. 2 and 20, making a funnel to gather the oil, with which the cutter-heads are necessarily kept flooded. A pocket, $A^{40}$, is provided at the lowest point in said funnel, over which the sieve $A^{41}$ is located, by means of which the oil is strained to take out the metal chips, so that the oil may be drawn in a comparatively clear state from said pocket by suitable pump, represented by the terminal pipe $A^{42}$.

Certain adjustments are possible and necessary which have not been before described.

It is obvious that the larger the head of the bolt the less can the arms of the levers $H^5$ be separated in order to clamp that head; and in order that proper adjustment may be made to accommodate all sizes of bolt-heads the cams $D^8$ are made with their lateral faces, against which the anti-friction rolls $H^{51}$ travel, converging toward the bolt-holding heads, and in cases of larger bolts, or bolts having larger heads, the cams $D^8$ are adjusted on the bed $D^4$ away from the bolt-carrying heads, so that the anti-friction rolls $H^{51}$ will travel over the thinner portion of the cam and be less separated in so traveling. The holes $d^8$, through which the bolts $d^{80}$ pass, which secure the cam $D^8$ to the base $D^4$, are elongated to permit this horizontal adjustment of the cams. Since the cam $J^{51}$ on the wheel $J^5$, when it has actuated the lever $J^3$, immediately causes the bolt-carrying heads to be revolved, it is essential that such actuation should not occur until the cutter-heads have withdrawn from the end of the bolt. This actuation, therefore, should be made to occur only at the last portion of the retreating movement of the cutter-heads. It is necessary, therefore, that the cam $J^{51}$ should be adjusted on the wheel $J^5$ to correspond with the adjustment of the parts at the other end of the machine which determine the length of the thread cut, so that when a long thread is cut and the bar L is therefore thrust forward a long distance in position to engage and actuate the ratchet-wheel through the larger arc, the cam shall be correspondingly farther from the stop $J^{51}$, so that it will not come into collision with the anti-friction rolls $J^{32}$ except at the latter part of the retreat of the bar L, and for this purpose both the said cam $J^{50}$ and the stop $J^{51}$ are made adjustable on the wheel $J^5$. Obviously the range of adjustment of either one alone might be made sufficient for the purpose; but it is more convenient to divide the adjustment between them.

Having now described in detail the construction of this machine, I will state what I consider to be its more general essential distinguishing features. First, the bolt is non-revolving and the cutter revolves upon it to form the thread; second, the bolt is both non-revolving and longitudinally unmoved while the thread is being cut, and the cutter both revolves and advances upon it to form the thread; third, the longitudinal advance of the cutter is positive and causes (instead of being caused by) the pitch of the thread which it cuts; fourth, the extent of the thread upon the bolt, or, as it has been called in the foregoing specification, "the length of the thread cut" is determined automatically and variably at will by adjusting mechanism connected with the movement; fifth, the adjustment to vary the pitch of the thread is independent of the adjustment which varies the length of the thread, so that either may be varied without affecting the other; sixth, the head which holds the bolt, called the "bolt-carrying head," moves and discharges the bolt vertically and holds it while it is being cut horizontally, whereby the receiving and discharging are effected by gravity and the clamping and releasing are effected in the interval wherein the change of position from vertical to horizontal and horizontal to vertical occurs; seventh, the motion of the bolt-holding head, whereby it changes the position of the bolt from vertical to horizontal and horizontal to vertical is produced by automatically coupling it to the driving-shaft by mechanism brought into operation by the mechanism which regulates the length of the thread, so that this movement, which must occur in the interval between the cutting of successive bolts away, is automatically brought about only at the end of each cutting process, however long or short that may be.

I claim—

1. In a bolt-cutting machine, in combination with the main driving-shaft and the cutter-head, and the train of mechanism which communicates rotary motion to the cutter-head from the shaft, a slide-bar connected to the cutter-head having slide-bearings parallel with the axis of said head, a bar having slide-bearings at right angles to those of the first-mentioned bar, a plate having slide-bearings, and a block adapted to travel in said bearings, one secured to the first-mentioned slide-bar and the other secured to the second-named bar, the said plate being adjustable in its securement to the bar to which it is fastened to change the direction of its slide-bearings, and a train of mechanism from the main driving-shaft to the second-named slide-bar, whereby it is actuated in its slide-bearings, substantially as set forth.

2. In a bolt-cutting machine, in combination with the driving-shaft and the revolving bolt-cutter head, and the train whereby said shaft communicates rotary motion to the cutter-head, the rack-bar $E^7$ and connections from it to the cutter-head, the wheel $C^5$ and the train of gear whereby the main driving-shaft rotates it, said wheel engaging the rack-bar $E^7$, the lever $C^{60}$, pivoted on the frame and engaging said bar, a cam on said lever, and a trip-block on the wheel $C^5$ in position to engage the cam and actuate thereby the lever to disengage the rack-bar from the wheel, substantially as set forth.

3. In combination, substantially as set forth, the revolving and longitudinally-movable cutter-head and connections therefrom to the rack-bar $E^7$, whereby the longitudinal movement of said rack-bar longitudinally actuates the cutter-head, the wheel $C^5$, engaging the rack-bar, the lever $C^6$, pivoted on the frame and connected to the rack-bar, the trip $E^{51}$ on the wheel $C^5$, and the cam $C^{60}$, secured to the levers $C^6$ and adjustable thereon to expose a greater or less portion of its face to the action of the trip, substantially as set forth.

4. In combination, substantially as set forth, the bar $E^7$, wheel $C^5$, lever $C^6$, and cam $C^{60}$, secured to said lever, the wheel $C^5$, having one or more trip-blocks adjustably and removably attached thereto in the same circle, whereby the bar $E^7$ may be disengaged from the wheel as frequently and at such intervals as desired in each revolution of the wheel by varying the number and position of said trip-blocks.

5. In combination, substantially as set forth, the bar $E^7$, wheel $C^5$, lever $C^6$, cam $C^{60}$, adjustably secured thereon, and the trip-blocks $E^{51}$, adjustably and removably secured to the wheel $C^{50}$, whereby a greater or less number may be employed at once, the cam $C^{60}$ being adjustable to expose a greater or less portion to the action of the trip-blocks, whereby the bar $E^7$ may be disengaged from the wheel $C^5$ as frequently and at such intervals and held out of engagement as long as desired, and the point of re-engagement determined at will.

6. In combination with the longitudinally-movable cutter-head, the wheel $C^5$, and the rack-bar $E^7$, engaged by it, and connections from said rack-bar to the cutter-head, the cam and trip mechanism which disengages said wheel and bar, and the spring $P^2$ and the connections therefrom to the cutter-head, whereby said spring reverses said cutter-head and the bar $E^7$, substantially as set forth.

7. In a bolt-cutting machine, the cutter-head, the bolt-feed tube, and the bolt-carrying head, the bolt-carrying head having journal-bearings at right angles to its cavity and revoluble in said bearings, the cutter having its axis, and the feed-tube having its longitudinal extent in the plane of rotation of the bolt-cavity and at an angle to each other, substantially as set forth.

8. In a bolt-cutting-machine, in combination with the cutter-head, the bolt-feed tube, the bolt-carrying head, and the clamp-cam, the cutter-head and feed-tube being both located in a plane at right angles to the revolution of the bolt-carrying head and at an angle to each other, said head having a bolt-cavity transverse with respect to its axis and the train which revolves the carrying-head, whereby the bolt-cavity is alternately in line with the feed-tube and with the cutter-head, and clamping mechanism adjacent to the bolt-cavity in the carrying-head and having a portion protruding from said head, and the clamping-cam fixed with respect to the bearings of the bolt-carrying head and located adjacent to the path in which the protruding portion of the clamping mechanism is carried by the revolution of said head and at the point in said path which is reached by said portion, where the bolt-cavity is in line with the cutter-head, substantially as set forth.

9. In a bolt-cutting machine, in combination, the cutter-head, the bolt-carrying head, and the bolt-feed tube, the bolt-carrying head being journaled in horizontal bearings and having the bolt-cavity at right angles to such bearings, and the cutter-head and feed-tube being both located in a plane also at right angles to said bearings, the feed-tube being vertical and at an angle to the cutter-head and the train which revolves the bolt-carrying head, whereby the bolt-cavity is vertical twice in each revolution and in the interval is in line with the cutter-head, substantially as set forth.

10. In a bolt-cutting machine, in combination with the cutter-head, the bolt-feed tube, the clamping-cam, and the bolt-carrying head, the bolt-carrying head being journaled in horizontal bearings and having the bolt-cavity at right angles to said bearings, and bolt-clamping mechanism in said head adjacent to such cavity and protruding from the bolt-carrying head, the cutter-head and feed-tube being also located in a plane at right angles to the bearings of the bolt-carrying head, the feed-tube being vertical and at an angle to the cutter-head, the train which revolves the cutter-head, whereby the bolt-cavity twice in each is vertical and thereby in line with the feed-tube and in one of the intervals is in line with the cutter-head, and the clamping-cam fixed with respect to the bearings of the bolt-carrying head and located adjacent to the path of the protruding part of the clamping mechanism and at the point in said path reached by said protruding part when the bolt-cavity is in line with the cutter-head, substantially as set forth.

11. In a bolt-cutting machine, in combination with the cutter-head, the bolt-carrying head having journal-bearings transverse to the axis of the cutter-head, and a bolt-cavity transverse to said journal-bearings, the bolt-feed tube located in the plane of rotation of the bolt-cavity and at an angle to the cutter-head, and the train which revolves the bolt-carrying head, whereby the bolt-cavity is alternately in line with the cutter-head and with the bolt-feed tube, a clutch-wheel in said train, and the tripping mechanism which disengages the clutch and locks the bolt-carrying head, said tripping and locking mechanism being located and timed to engage the wheel when the bolt-cavity is in line with the cutter-head, whereby the bolt-carrying head is held stationary at that position, substantially as set forth.

12. In a bolt-cutting machine, the cutter-head and its advancing and retracting mechanism, the bolt-carrying head journaled transversely to the line of advance and retreat of the cutter-head, and the train which revolves the cutter-head in said bearings, comprising a clutch-wheel, tripping mechanism which actuates the clutch-wheel to force it into engagement, and a connecting-rod from the cutter-head to the tripping mechanism, whereby the retreat of the cutter-head actuates the tripping mechanism to cause it to engage the clutch-wheel with the remainder of the bolt-carrying-head-driving train, substantially as set forth.

13. In combination with the cutter-head, the mechanism which retracts it, the bar connected to and longitudinally actuated by said retracting mechanism, the wheel $J^5$, engaged and actuated by said bar in its retreating movement, the shifting-lever $J^3$, actuated by said wheel, the bolt-carrying head journaled transversely to the line of advance and retreat of the cutter-head, and the clutch-wheel J in the train which rotates the bolt-carrying head actuated by the lever $J^3$ out of engagement with the remainder of the bolt-carrying-head-driving train, substantially as set forth.

14. In combination, substantially as set forth, the bolt-carrying head, its actuating clutch-wheel J, the lever $J^3$, pivoted on the bearings of the clutch-wheel and having one end engaging the hub and the other resting upon the rim of said wheel, a spring tending to actuate the lever to disengage the clutch-wheel, said clutch-wheel rim having the notch $j^{21}$, adapted to receive the arm of the lever $J^5$, which rests upon said rim, whereby said rim detains the lever in position to hold the clutch-wheel in engagement with the train, and said notch allows it to be forced by the spring out of such engagement, by engaging the lever-arm, and locks the said clutch-wheel and bolt-carrying head stationary.

15. In combination with the bar L, the wheel $J^5$, having its ratchet engaged by said bar and having the cam $J^{51}$, the lever $J^3$, contacting the cam, and the clutch-wheel J, engaged by the lever and having the rim $J^2$, serving as a delay-surface for the same, substantially as set forth.

16. In combination with the cutter-head and its advancing mechanism and the adjustable mechanism which controls the duration of the advance movement, the bar L, connected to and actuated by the cutter-head-advancing mechanism, the wheel $J^5$, having a ratchet over which the bar L advances and adapted to be engaged by said bar in its retreat, the cam $J^{51}$, which actuates the clutch-shifting mechanism adjustably secured on said wheel $J^5$, whereby the instant of engagement of said clutch may be made to coincide with the completion of the retreating movement of the cutter-head, substantially as set forth.

17. In a bolt-cutting machine, in combination with the cutter-head having a part (as the collar $N^5$) whose retraction opens the jaws, the retracting mechanism having as a part of it the pin $N^7$, engaging said collar, whereby the retracting movement of the retracting mechanism first retracts the collar and opens the jaws, substantially as set forth.

18. In a bolt-cutting machine, in combination with the cutter-head having a part (as the collar $N^5$) whose retraction opens the jaws, the retracting mechanism having as a part of it the pin $N^7$, engaging said collar, and the cam projection $N^8$, engaging the pin to disengage it from said collar before the limit of the retracting movement is reached, substantially as set forth.

19. In a bolt-cutting machine, in combination with the cutter-head having a part (as the collar $N^5$) whose retraction opens the jaws, the retracting mechanism having as a part of it the pin $N^7$, engaging said collar, the cam projection $N^8$, engaging the pin to disengage it from said collar before the limit of the retracting movement is reached, said cutter-head having beside the collar $N^5$ other means of engagement with the retracting mechanism, as the flange $N^9$, and a suitable stop to arrest the collar $N^5$ after the disengagement of the pin while the retracting mechanism further retracts the cutter-head, whereby the jaws are closed during the last part of the retracting movement, substantially as set forth.

20. In combination with the bar L, the wheel $J^5$, having the cam $J^{50}$, the lever $J^3$, actuated by said cam, the clutch-wheel J, actuated by the lever and having the cam projection $j^{21}$, the spring $J^6$, engaging and tending to reverse the wheel $j^5$, the plunger $D^{91}$ and the connections by which the cam projection $j^{21}$ actuates it, whereby the ratchet-wheel $J^5$ is released from the bar L after the clutch is engaged, and the spring $J^6$ is allowed to restore said wheel to its initial position, substantially as set forth.

21. In combination with the plunger $D^{91}$, the cam $D^{92}$, having the notch $d^{94}$ to receive and form a seat for the foot of the plunger, the form of said notch being angular, as described, whereby one side of it is stopped against the plunger while the other side stops the plunger, substantially as set forth.

22. In combination with the bolt-feed tube and the transverse slides $D^{62}$ and $D^{63}$ therein, the mouth of each slide having a larger and smaller portion, the larger portion of each mouth being in line with the smaller portion of the other, and the bar which reciprocates said slides transversely to bring the larger and smaller portions of each mouth alternately into the bolt-channel of the bolt-feed tube, substantially as set forth.

23. In combination with the bolt-feed tube, the transverse slides $D^{62}$ and $D^{63}$ therein, having their mouths comprising larger and smaller portions arranged, respectively, substantially as described, the slide-bar $D^{64}$, having the oblique slots which engage the slides $D^{62}$ $D^{63}$, (as at their necks $d^{63}$,) the rock-shaft having the lever-arms M' $M^2$, and the bolt-carrying head having the cam projection $h^{20}$, which engages the arm M' and causes the arm $M^2$ to actuate the bar $D^{64}$ and the spring $D^{65}$ to reverse the movement of the said bar, substantially as set forth.

24. In combination with the bolt-carrying head having the bolt-clamps and the levers which actuate them protruding from the head, the cam $D^8$, contacted by said levers and having its cam-faces converging toward the bolt-carrying head and adjustable toward and from said head, substantially as set forth.

25. In a bolt-carrying head, in combination with the body, the clamp-blocks $H^4$, having similar concavities on their proximate faces, diminishing from the receiving end toward the middle, and the plates $H^8$, having the bolt-emerging aperture formed by the notches $h^{81}$ on their proximate edges, said plates being laterally adjustable to vary the size of the aperture formed by the notches, and the adjusting-screws $h^{40}$, to limit adjustably the separation of the clamp-blocks $H^4$, whereby the aperture between them may be adjusted to correspond with the bolt-emerging aperture, substantially as set forth.

26. In the bolt-carrying head, in combination with the body, the clamp-blocks $H^4$, having the outer portion of their cavities $H^{41}$ enlarging toward the outer end, and the plates $H^8$, having the bolt-emerging aperture formed by the notches $h^{81}$ in their proximate edges lapping over and partially closing the opening between the said clamp-blocks, substantially as and for the purpose set forth.

JOSIAH M. SIMPSON.

Witnesses:
JOHN B. KASPARI,
THOS. H. COSGROVE.